(12) United States Patent
Bornemann et al.

(10) Patent No.: US 10,996,110 B2
(45) Date of Patent: May 4, 2021

(54) LEARNING METHOD FOR PRODUCING COLOR FORMULAS

(75) Inventors: Christian Bornemann, Münster (DE); Heiner Cloppenburg, Münster (DE); Carlos Vignolo, Hettstadt (DE); Jürgen Lohmann, Münster (DE); Stuart Kendall Scott, Dearborn, MI (US)

(73) Assignee: BASF Coatings GmbH, Munster (DE)

( * ) Notice: Subject to any disclaimer, the term of this patent is extended or adjusted under 35 U.S.C. 154(b) by 1870 days.

(21) Appl. No.: 12/673,205

(22) PCT Filed: Aug. 13, 2008

(86) PCT No.: PCT/EP2008/006643
§ 371 (c)(1),
(2), (4) Date: Dec. 21, 2010

(87) PCT Pub. No.: WO2009/021720
PCT Pub. Date: Feb. 19, 2009

(65) Prior Publication Data
US 2011/0097691 A1  Apr. 28, 2011

(30) Foreign Application Priority Data

Aug. 14, 2007 (DE) .......................... 102007038483.3

(51) Int. Cl.
*G01J 3/46* (2006.01)
(52) U.S. Cl.
CPC ............ *G01J 3/46* (2013.01); *G01J 3/462* (2013.01); *G01J 3/463* (2013.01)
(58) Field of Classification Search
CPC ............... G01J 3/46; G01J 3/462; G01J 3/463
(Continued)

(56) References Cited

U.S. PATENT DOCUMENTS

| 5,929,998 A | 7/1999 | Kettler et al. |
| 6,870,614 B2 * | 3/2005 | Graf et al. .................... 356/319 |

(Continued)

FOREIGN PATENT DOCUMENTS

| CN | 1643351 A | 7/2005 |
| DE | 19720887 A1 | 1/1998 |

(Continued)

OTHER PUBLICATIONS

International Search Report for International Application No. PCT/EP2008/006643 dated Dec. 23, 2008.

(Continued)

*Primary Examiner* — Joseph B Baldori
(74) *Attorney, Agent, or Firm* — Servilla Whitney LLC

(57) ABSTRACT

A heuristic process for color formula calculation of pigmented shades matched to a target shade, comprising the steps of
  i) using suitable calibration scales to compile an effect matrix for each of the ingredients included in a coloring system,
  ii) determining the optical materials parameters of the target shade,
  iii) selecting a suitable starting formula,
  iv) determining the color difference between the starting formula and the target shade,
  v) calculating a first matched color formula while taking account of the effect matrices,
  vi) repeating steps iv) and v) until an acceptable remaining color difference is reached,
wherein the effect matrices are continually updated with shade-relevant information during ongoing operation, achieves an improvement on the existing processes for shade formula calculation, not only in terms of reducing the (Continued)

number of tinting steps needed but also in terms of minimizing the remaining color difference.

11 Claims, 1 Drawing Sheet

(58) Field of Classification Search
USPC .................................................. 434/98, 103
See application file for complete search history.

(56) References Cited

U.S. PATENT DOCUMENTS

2005/0128484 A1\* 6/2005 Rodrigues et al. ........... 356/402
2005/0185840 A1\* 8/2005 Sugiura et al. ............... 382/167

FOREIGN PATENT DOCUMENTS

| DE | 19636774 C2 | 4/1999 |
|---|---|---|
| EP | 0828144 A2 | 9/1997 |
| WO | WO02063557 A2 | 8/2002 |
| WO | WO03083420 A1 | 10/2003 |
| WO | WO2004/012102 A2 | 2/2004 |
| WO | WO2006/052556 A2 | 5/2006 |
| WO | WO2006052561 A2 | 5/2006 |

OTHER PUBLICATIONS

Written Opinion for International Application No. PCT/EP2008/006643 filed on Aug. 13, 2008.
International Preliminary Report on Patentability for international application No. PCT/EP2008/006643 dated Mar. 2, 2010.

\* cited by examiner

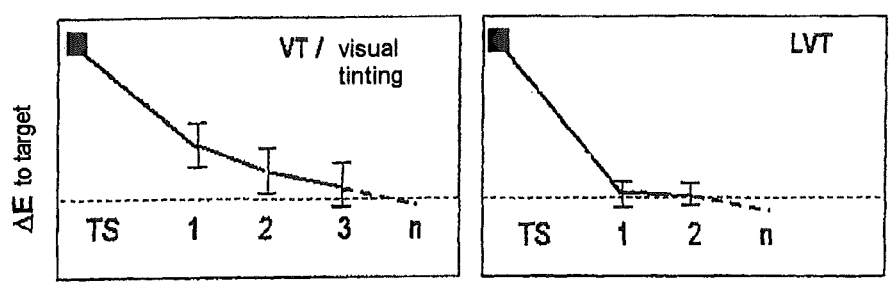

LEARNING METHOD FOR PRODUCING COLOR FORMULAS

CROSS REFERENCE TO RELATED APPLICATIONS

This application is a National Phase Application of Patent Application PCT/EP2008/006643 filed on 13 Aug. 2008, which claims priority to DE102007038483.3, filed 14 Aug. 2007, both of which are hereby incorporated by reference in their entirety.

FIELD OF THE INVENTION

The invention relates to a heuristic process for producing color formulas which can be matched in a few steps to a fixed color specification.

BACKGROUND OF THE INVENTION

In the production of paint batches, particularly in the automobile industry, an important task is to produce the shade, which is brought about by the weighing-out of the amounts of the ingredients specified in a color formula, with as little deviation as possible from a target shade specified beforehand. The formula ingredients may include both colored ingredients, such as color pigments or effect pigments, for example, and noncolored ingredients, which are taken to include binders, additives, and solvents, for example. The objective in the tinting of the batches is to match the shade of the batch to the target shade in as few tinting steps as possible, in line with the economics of the operation. This matching is performed by means of slight changes to the amounts of the colored ingredients included in the formula, and also, where appropriate, by addition of further colored tinting adjuvants in small concentrations. The matching step is not concluded until an acceptable remaining color difference is reached between the shade of the batch and the target shade.

Whereas the tinting procedure described was once principally carried out visually, nowadays instrumental control measures are used definitively. These include in particular the employment of a spectrophotometer, which is used to record reflection spectra in the visible region of the electromagnetic spectrum, at different angles of illumination and observation. Combining these reflection spectra with an illuminant and a respective one of the three standard spectral distribution functions produces coordinates which specify the color locus, i.e., the position of the shade within the color space. An established standard is the color space of what are termed the CIELab coordinates L*, a* and b*. Color differences dL*, da* and db* are then produced from the difference between two color loci in terms of the respective coordinates L*, a* and b* measured for the two shades.

The German laid-open specification DE 197 20 887 A1 discloses a process for color formula calculation in the field of effect-imparting surface coatings which is based on the compilation of a calibration scale for each pigment on which a colorant system is based. A description is given of how the associated reflection factors are subsequently determined experimentally. In this way, for each color pigment and for each effect pigment, the corresponding optical materials parameters are obtained, such as scattering coefficient, absorption coefficient or phase function, which are inserted into the arithmetic determination of the formula for a specified effect shade by means of computer simulation. The optical materials parameters thus describe the properties of the pigments as present in dispersion in the respective binder system. They are wavelength-dependent and must be determined for each desired wavelength. The quality of the calculated formulas is heavily dependent overall on the standardization of all the components of a mixer paint system and on the constancy of the application parameters. Against this background it is noted that the optical materials parameters, on account of the complexity and cost involved in determining them, are determined only once for the respective pigment in the binder system.

Another arithmetic process for the shade matching of paints or inks is known from the European laid-open specification EP 0 828 144 A2. That process first determines the reflection factors for the target shade, using a goniospectrophotometer, and then uses these factors to calculate the associated tristimulus values and/or the vectors derived from them within the CIELab color space. The next step is to use the reflection spectra or the colorimetric numbers derived from them to identify, from a formula database, those formulas or shades which are most similar in terms of their reflection properties to those of the target shade. Using an effect matrix, which again is drawn up arithmetically, the remaining shade difference between the target shade and the database shade is minimized, by means of an arithmetic algorithm for function minimization, taking account of constraints in the sense of the $L_2$ standard, and a corrected formula is drawn up. This effect matrix is a critical factor for the quality of shade matching. As already described above roughly for the process of DE 197 20 887 A1, it is compiled by means of experimentally determined calibration scales of the reflection parameters of the pigments on which the formula is based, and is likewise stored in the formula database. The effect matrix therefore describes the coloristic effect of the individual formulas in the reflection space or color space, as a function of angle, for varying pigment concentrations.

Building on the process just described, wide-ranging investigations have been carried out in order to improve further and refine the arithmetic programs for determining the target formula for a shade matched to the original. Representing this aspect of a process for producing color formulas which are required to be aligned with an original, the publications WO 2006/052556 A2 and WO 2006/052561 A2 describe optical implementations of the matching procedure which are based on visualizing the individual steps for the user on a monitor, by means of color reproduction in the RGB color space. In this way a connection is produced between the time-honored visual matching and the computer-assisted and instrument-assisted matching, allowing simulation of the effects of changes to individual pigments and/or ingredients of the formula.

A disadvantage associated with all of the existing processes, however, is that they do not offer any possibility of detecting fluctuations in the raw materials and ingredients, or shade differences due to different production methods and application methods. From experience, fluctuations of this kind can be large enough to necessitate renewed matching of the shade produced to the target shade, despite the formula corresponding with the calibration scales determined beforehand. In industrial line production, this can lead to considerable costs, as a result either of remedial work required on the otherwise finished products, or of time lost due to further adaptations.

SUMMARY OF THE INVENTION

It is an object of the invention, therefore, to provide a process for color formula calculation that also takes account of the fluctuations in raw materials and ingredients and also of the effects of operational fluctuations and thereby minimizes the remaining color difference from the target shade while at the same time reducing the number of tinting steps needed.

Surprisingly it is found that a process for color formula calculation of pigmented shades matched to a target shade, comprising the steps of
  i) using suitable calibration scales to compile an effect matrix for each of the ingredients included in a coloring system,
  ii) determining the optical materials parameters of the target shade,
  iii) selecting a suitable starting formula,
  iv) determining the color difference between the starting formula and the target shade,
  v) calculating a first matched color formula while taking account of the effect matrices,
  vi) repeating steps iv) and v) until an acceptable remaining color difference is reached,
wherein the effect matrices are continually updated with shade-relevant information during ongoing operation, achieves an improvement on the existing processes, not only by reducing the number of tinting steps needed but also by minimizing the remaining color difference.

BRIEF DESCRIPTION OF THE DRAWING

FIG. 1 is a diagrammatic illustration of a heuristic correction according to one embodiment of the invention versus conventional, static tint-coloring.

DETAILED DESCRIPTION OF THE INVENTION

The purpose of the text below is to illustrate how the first effect matrix drawn up for a coloring system is specifically determined.

A first prerequisite for the drawing-up of the effect matrix is that the optical materials parameters of all components of the coloring system are known.

The optical materials parameters are determined by matching the radiative transfer equation in the sense of an $L_2$ standard to the beam density factors or reflection factors determined experimentally for each pigment.

For the case of the solid-color pigments, the known Schuster/Kubelka/Munk approximation of the radiative transfer equation is completely sufficient. Within this 2-flux approximation, a simple relationship can be derived between the reflection of, say, an opaque paint film and the scattering and absorption properties of the pigments present in that film.

The pigment-specific and wavelength-dependent materials parameters of the scattering and absorption coefficients must be determined experimentally via a calibration scale in a manner known to the skilled worker.

In order to describe effect shades it is necessary to replace the known Schuster/Kubelka/Munk approximation of the radiative transfer equation by another form, known to the skilled worker, of the radiative transfer equation. As well as the scattering and absorption coefficients, the phase function must be determined as well.

Measuring the reflection areas can be done using a stationary or portable goniospectrophotometer with symmetrical or asymmetrical measuring geometry. The range of observation angle to be covered depends on the particular approximation of the radiative transfer equation that is being used. Instruments with illumination modulation and instruments with observation modulation can be used.

To determine the coloristic effect matrix, the amounts of the formula components (N pigments) for a specified formula are varied slightly around their setpoint concentration, and the associated coloristic effect is calculated in the reflection space or in the CIELab space, angle-dependently (M angle), by means of the optical materials parameters. In other words, the consequences of changes in the concentration of the formula ingredients whose materials parameters are known can be calculated as consequences in the color space or in the reflection space.

The information content of the effect matrix can thus be utilized, immediately or later on at any desired point in time, for tinting a reference formula toward a target point deviating from the reference point. This target point should not be so far removed from the reference point that the sphere of validity of the approximation used is exceeded.

In principle the concept of "shade-relevant information" is understood in the art to refer to shade changes $dL^*$, $da^*$ and $db^*$ for achromatic shades and $dL^*$, $dC^*$ and $dH^*$ for chromatic shades, as already elucidated above. Shade changes of this kind, expressed by $dL^*$, $da^*$ and $db^*$ for achromatic shades and $dL^*$, $dC^*$ and $dH^*$ for chromatic shades, may come about in a variety of ways in the operation of producing a batch. Some key influencing factors include
  raw-materials fluctuations, particularly in the pigments used for paste production, which influence the shade, such as the particle size distribution, surface nature, and layer thickness of the pigments, for example;
  fluctuations in the weighing-out of the raw materials for intermediate production, of pigment pastes, for example, and operational fluctuations occurring in the course of this procedure;
  fluctuations in the weighing-out of the intermediates for batch production, and operational fluctuations occurring in the course of this procedure;
  application parameters associated with the painting of the batch, such as horn air, atomizer air, outflow rate, belt speed, high voltage, and bell speed, and other environmental parameters such as temperature, humidity, air descent velocity or UV radiation, for example.

An ab initio description of the fluctuations in the aforementioned parameters and their consequences for the color behavior of the batch may not be relevant to practice, owing to the diverse influences and owing to the complexity of the interrelationships. Moreover, the often inadequately precise capture of these data is a hindrance to a purely theoretical approach of this kind. For this reason, in practice a phenomenological approach is used for determining the shade changes $dL^*$, $da^*$ and $db^*$ for achromatic shades and $dL^*$, $dC^*$ and $dH^*$ for chromatic shades in the batch manufacturing operation. For this purpose it is possible in practice to describe the shade changes preferably as a function of the concentration of the intermediates employed. The shade changes can then be portrayed as differentials: $dL^*/dc_i$, $da^*/dc_i$, $db^*/dc_i$ and $dL^*/dc_i$, $dC^*/dc_i$, $dH^*/dc_i$. In the same way the shade changes can be captured as a function of the aforementioned operational parameters.

The term "shade-relevant information" refers here and below to all information and measurements which encompass changes in shade that are induced by respective quantity changes or batch changes during ongoing operation. This term therefore collects together the entirety of the dependences of the shade changes in the form of differentials of the effect matrix that is to be drawn up from them.

On the one hand this information can be collected in the sense of this invention additionally to existing operations. Preferably, however, it can be obtained from existing checking operations. For example, such information may be obtained in routine, ongoing quality control. With particular preference the color-relevant information is obtained from laboratory tests, quality checks, incoming-goods checks or in-plant samples.

The term "coloring system" refers here and below to any constellation of at least two different pigments and/or binders. A coloring system preferably comprises compositions containing a large number of different color or effect pigments, and these compositions can be referred to either as the base shade or as the pigment paste.

Pigments which can be used in accordance with the invention include not only absorption pigments but also effect pigments or what are known as pseudopigments. There are no restrictions on the number or selection or constellation of the pigment components. They can be matched as desired to the particular requirements. For example, a coloring system of this kind may be based on all of the pigment components of a standardized mixer paint system.

Effect pigments are any pigments which exhibit a platelet-like structure and endow a surface coating with special decorative effects. The effect pigments are, for example, all of the effect-imparting pigments which can typically be employed in vehicle finishing and industrial coating or in the production of inks and colorants. Examples of such pigments are pure metal pigments such as aluminum, iron or copper pigments, for example, interference pigments such as titanium dioxide-coated mica, iron oxide-coated mica, mixed oxide-coated mica, and metal oxide-coated aluminum, for example, or liquid-crystal pigments.

The color-imparting absorption pigments are, for example, typical organic or inorganic absorption pigments which can be employed in paint chemistry. Examples of organic absorption pigments are azo pigments, phthalocyanine, quinacridone, and pyrrolopyrrole pigments. Examples of inorganic absorption pigments are iron oxide or lead oxide pigments, titanium dioxide, and carbon black.

Examples of what are called pseudopigments are substances which influence topology with respect to the effect pigments, but which are otherwise coloristically inactive. They are preferably selected from the group of the known fillers.

The inventive updating of the effect matrices with the current shade-relevant information introduces a dynamism, in contrast to the existing processes, which allows fluctuations in the raw materials and ingredients, and also fluctuations due to production and application operations, to be detected and taken into account accordingly. In this sense the process of the invention can be termed heuristic.

In this way, moreover, it is possible for the first time to achieve a sharp increase in the accuracy of the process. The accuracy of the process, indeed, is critically dependent on the quality of the effect matrices.

In a further embodiment of the present invention, the effect matrices can be expanded with shade-relevant information from laboratory tests, quality checks, incoming-goods checks, and in-plant samples. In this embodiment of the process the effect matrices first determined when working out and drawing up a base shade or a color paste are subsequently expanded with further parameters. This expansion of the effect matrices takes place preferably as a result of shade-relevant information which is obtained during ongoing operation through the measurement of changes in shade as a function of different quantities, application methods or batches. From this information it is possible to determine the changes in the optical materials parameters, which ultimately are adopted into the effect matrices.

The process of the invention can be used, for example, for tinting paints and printing inks or polymer dispersions.

The invention is elucidated below with reference to the drawing, without restricting the invention to that drawing.

FIG. 1 therein shows a diagrammatic representation of the heuristic correction of the invention (on the right) as compared with the conventional, static tint-coloring.

Starting out from the same reference mixture, stepwise correction is used to obtain a corrected shade which achieves an acceptable remaining color difference with respect to the associated shade standard. As is apparent from the FIGURE, the conventional process requires a substantially greater number of tinting steps in order to reach the target point than is the case in the new heuristic process. One characteristic of the heuristic, dynamically updated process can be seen in the fact that, owing to the high quality of the effect matrices, a very substantial approximation to the target point is accomplished even in the first tinting step.

What is claimed is:

1. A process for formulating a color match of pigmented shades to a target shade, comprising:
   i) using calibration scales to compile an effect matrix for each of the ingredients included in a coloring system, the effect matrix being determined by varying amounts of one or more pigments for a specified formula around a setpoint concentration and an associated coloristic effect being calculated in a reflection space or in CIELab space angle-dependently using optical materials parameters, the coloring system being a composition of at least two different pigments and/or binders, the calibration scales being compiled using information related to variations between raw material batches of the ingredients used in the coloring system, wherein information content of the effect matrix is utilized for tinting a reference formula toward a target point deviating from a reference point in the reference formula,
   ii) determining the optical materials parameters of the target shade,
   iii) selecting a starting formula,
   iv) determining the color difference between the starting formula and the target shade,
   v) calculating a first matched color formula while taking account of the effect matrices,
   vi) using the first matched color formula to produce a coloring system matched to a target shade, and
   vii) repeating steps iv) v) and vi) until a target color difference is reached,
   so as to continually update the effect matrices with shade-relevant information during ongoing production of the coloring system, the shade-relevant information comprising the entirety of the dependences of shade changes in the form of differentials of the effect matrix expressed by $dL^*/dc_i$, $da^*/dc_i$ and $db^*/dc_i$ for achromatic shades and $dL^*/dc_i$, $dc^*/dc_i$ and $dH^*/dc_i$ for chromatic shades.

2. The process of claim 1, wherein the shade-relevant information is obtained from at least one of laboratory tests, quality checks, incoming-goods checks, and in-plant samples.

3. The process of claim 1, wherein the effect matrices are expanded with shade-relevant information from at least one of laboratory tests, quality checks, incoming-goods checks, and in-plant samples.

4. A method of tinting paints, printing inks, or polymer dispersions, comprising employing the process of claim 1 to obtain a color formula.

5. The process of claim 1, wherein the resulting color difference between the coloring system and the target shade is less than the color difference between the target shade and a comparative coloring system matched to the target shade produced by a comparative formulating process which does not use calibration scales which use information related to variations between raw material batches of the ingredients used to produce the comparative coloring system.

6. The process of claim 5, wherein the coloring system of claim 1 is produced in fewer steps than the comparative coloring system and the color difference between the coloring system and the target shade is the same or substantially similar to the color difference between the comparative coloring system and the target shade.

7. The process of claim 1, wherein the target color difference is reached in no more than three repetitions of steps iv), v) and vi).

8. The process of claim 1, wherein the target color difference is reached in no more than two repetitions of steps iv), v) and vi).

9. A process for formulating a color match of pigmented shades to a target shade, comprising:
   i) using calibration scales to compile an effect matrix for each of the ingredients included in a coloring system, the effect matrix being determined by varying amounts of one or more pigments for a specified formula around a setpoint concentration and an associated coloristic effect being calculated in a reflection space or in CIELab space angle-dependently using optical materials parameters, the coloring system being a composition of at least two different pigments and/or binders, the calibration scales being compiled using information related to variations between raw material batches of the ingredients used in the coloring system, wherein information content of the effect matrix is utilized for tinting a reference formula toward a target point deviating from a reference point in the reference formula,
   ii) determining the optical materials parameters of the target shade,
   iii) selecting a starting formula,
   iv) determining the color difference between the starting formula and the target shade,
   v) calculating a first matched color formula while taking account of the effect matrices,
   vi) using the first matched color formula to produce a coloring system matched to a target shade, and
   vii) repeating steps iv) v) and vi) until target color difference is reached,
   so as to continually update the effect matrices with shade-relevant information during ongoing production of the coloring system, the shade-relevant information comprising the entirety of the dependences of shade changes in the form of differentials expressed by $dL^*/dc_i$, $da^*/dc_i$ and $db^*/dc_i$ for achromatic shades and $dL^*/dc_i$, $dC^*/dc_i$ and $dH^*/dc_i$ for chromatic shades, and wherein the shade-relevant information is obtained from at least one of laboratory tests, quality checks, incoming-goods checks, and in-plant samples, and wherein the effect matrices are expanded with shade-relevant information from at least one of laboratory tests, quality checks, incoming-goods checks, and in-plant samples.

10. The process of claim 9, wherein the target color difference is reached in no more than three repetitions of steps iv), v) and vi).

11. The process of claim 9, wherein the target color difference is reached in no more than two repetitions of steps iv), v) and vi).

* * * * *

UNITED STATES PATENT AND TRADEMARK OFFICE
CERTIFICATE OF CORRECTION

PATENT NO. : 10,996,110 B2  
APPLICATION NO. : 12/673205  
DATED : May 4, 2021  
INVENTOR(S) : Bornemann et al.

Page 1 of 1

It is certified that error appears in the above-identified patent and that said Letters Patent is hereby corrected as shown below:

In the Claims

In Claim 1, Column 6, Line 58, replace "dc*/dc$_i$" with "dC*/dc$_i$"

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*